UNITED STATES PATENT OFFICE.

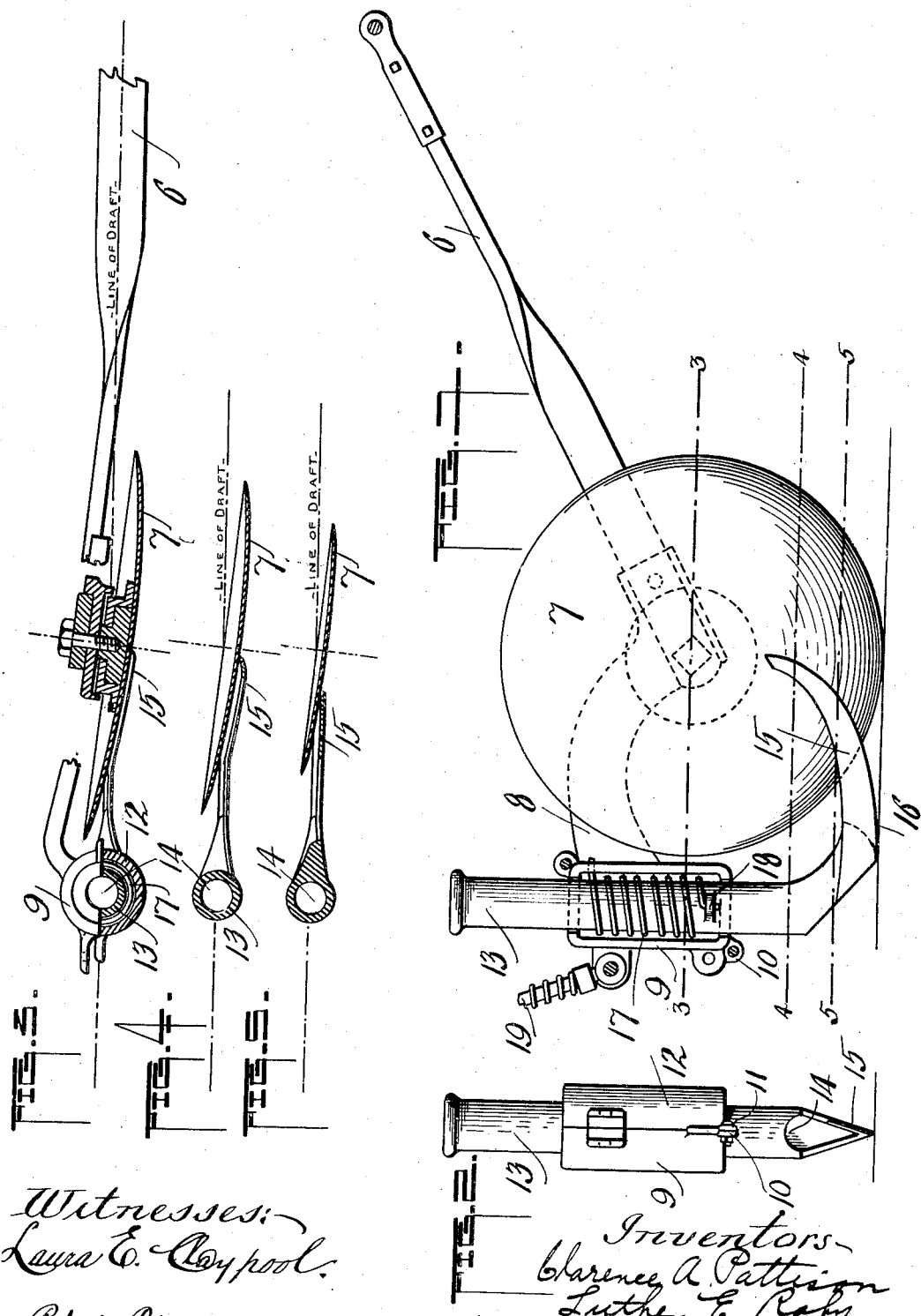

CLARENCE A. PATTISON AND LUTHER E. ROBY, OF PEORIA, ILLINOIS.

GRAIN-DRILL.

1,037,303.  Specification of Letters Patent.  Patented Sept. 3, 1912.

Application filed August 20, 1909. Serial No. 513,885.

*To all whom it may concern:*

Be it known that we, CLARENCE A. PATTISON and LUTHER E. ROBY, citizens of the United States, residing at Peoria, in the county of Peoria and State of Illinois, have invented certain new and useful Improvements in Grain-Drills; and we do hereby declare that the following is a full, clear, and exact description of the invention, which will enable others skilled in the art to which it appertains to make and use the same.

This invention has reference to certain new and useful improvements in grain drills, and relates particularly to the mounting for the shank and shoe or runner in connection with the disk with which they are associated and with which they coöperate.

One of the objects of the present invention is to combine with a disk furrow opener, a shank having a combined runner and scraper, the function of said runner and scraper being to follow in the furrow cut by the disk, that the seed may be deposited at the deepest point of the furrow, and further to coöperate with the convex face of the disk to scrape the same, if such is desired, a compression and torsion spring serving to both normally retain the shank and shoe in its normal depressed position and to hold the forward portion of the shoe in contact with the face of the disk.

The invention has for a further object to support a seed tube adjacent the disk, with the shoe or runner of the tube, preferably unattached; the said tube capable of vertical movement in its support, independent of the disk, whereby when the disk is forced into the ground to open the furrow, said tube with its shoe or runner may automatically raise and lower, that the shoe or runner will ride in the furrow cut by the disk.

The invention consists further, in the provision of details more particularly set out in the following description, claimed in the appended claims, and illustrated in the accompanying drawings, in which—

Figure 1 is a side elevation, partly in section, showing our improvements in grain drills; Fig. 2 is a rear elevation of the shank and support and guide therefor; Fig. 3 is a partial plan and cross-section as the same would appear on the line 3—3 of Fig. 1; Fig. 4 is a cross-section in plan as the same would appear on the line 4—4 of Fig. 1, and Fig. 5 is a cross-section in plan as the same would appear if taken on the line 5—5 of Fig. 1.

Like numerals of reference indicate corresponding parts throughout the figures.

In the drawings 6 denotes a draw-bar of the usual or approved construction, which may be mounted or attached to the frame or other suitable parts of a drill in any desired manner. To the inner end of the draw-bar is journaled, in any suitable manner, a disk furrow opener 7. Said disk is preferably connected to the draw-bar so that its cutting edge is disposed diagonally to the line of draft, as seen in Figs. 3, 4 and 5.

To the bearing of the disk or disk support, on the concave or furrow side of the disk, is attached the forward end of an arm or frame 8. This arm is carried slightly upwardly and rearwardly and at the rear of the disk is offset laterally and formed with a semi-circular barrel section 9 having ears 10, to which may be bolted or otherwise secured, similar ears 11 of a semi-circular barrel section 12. Uniting the sections 9 and 12 forms a barrel or socket, the axis of which is preferably in the line of draft, see Fig. 3.

13 denotes a shank or seed conducting tube, preferably of the closed delivery type, being provided with a conduit 14 extending from the upper or receiving end of the shank to the lower or delivery end thereof. To the lower end of said shank is connected in any suitable manner, a combined shoe and scraper 15, the runner or cutting edge 16 thereof being straightened between its rear end and its point of contact with the convex face of the disk and preferably following in the line of draft of the disk, as shown in Figs. 3, 4 and 5. The upper forward portion of the shoe and scraper 15 is bent to conform to the surface of the convex face of the disk and is unattached at its forward end, as shown in Fig. 1.

The shank or seed tube 13 is placed in the half section 9, with a compression and torsion spring 17 coiled about the shank, as shown in Fig. 1, with one end of the spring attached to a lug 18 on the shank and its opposite end attached to the section 9, when the section 12 may be secured to the section 9, inclosing a portion of the body of the shank in the barrel, together with the spring, and yet allowing the shank to have vertical movement in the barrel. The spring 17 normally holds the shank to its lowermost position and yieldingly holds the scraping portion of the shoe and scraper 15 in contact with the convex face of the disk. The vertical movement of the shank or seed tube, to which reference has been made, has its peculiar advantage in machines of this type, when it is considered that the shoe or runner of said tube is to travel in the furrow cut by the disk. To depress the disk and tube, to force the disk into the ground to open the furrow, they both oscillate or swing on the pivot of the draw-bar 6. It will be observed that the tube will swing on a longer radius than the disk, and that therefore if the tube could not move vertically in its support the device would fail in the particular use for which it is intended, and that is, to have the shoe always in the furrow cut by the disk; as it is, when the disk is forced into the ground, the shank or seed tube with the vertical movement of which it is capable, will automatically adjust itself to keep the shoe in the furrow, the spring 17 yieldingly holding the tube and shoe to their positions.

To the barrel may be attached a spring lift rod 19 for depressing the disk to a suitable depth in the ground which will carry with it the shank and shoe and scraper to follow in the furrow formed by the disk depositing the seed in the deepest portion of the furrow cut by the disk; said rod being used also for elevating the parts of the ground.

Having thus fully described our invention, what we claim and desire to secure by Letters Patent of the United States, is:—

1. In a grain drill, in combination, a support, a disk journaled on said support and having its cutting edge disposed diagonally to the line of draft, an arm connected to the disk support and extending to a point rearwardly of the disk and offset laterally, a barrel connected with the offset portion of said arm, a shank extending through said barrel, a combined shoe and scraper attached to the lower end of the shank and having a portion of its lower edge disposed in the line of draft, and a compression and torsion spring connected with said shank and said arm.

2. In a grain drill, in combination, a disk and disk support, an arm carried rearwardly from said support, a barrel suitably connected with the rear end of said arm, a shank carried in said barrel, a combined shoe and scraper connected with the lower end of said shank, and a compression and torsion spring, coiled about said shank and disposed within said barrel and connected with said shank and said barrel.

3. In a grain drill, in combination, a disk and disk support, a shank associated with said disk, said shank provided with a combined shoe and scraper, means for supporting the shank in the rear of the disk, and yielding means for normally holding the shank depressed and the scraping portion of the shoe in contact with the disk.

4. In a grain drill, in combination, a disk and disk support, an arm attached to and extending rearwardly from said support, a shank supported in working position by said arm, in such a manner that the shank may have vertical movement independent of the arm and be oscillated, a combined shoe and scraper attached to said shank, and a compression and torsion spring connected with said shank and with said arm.

5. In a grain drill, in combination, a disk and disk support, an arm attached to and extending rearwardly from said arm, a semi-circular barrel section connected with the rear end of said arm, a similar semi-circular barrel section adapted to be secured to said first mentioned section, a shank adapted to be inclosed by said barrel section, a combined shoe and scraper attached to the lower end of said shank, and a compression and torsion spring coiled about said shank and within said barrel sections, and having one end connected to the shank and the other end to the barrel.

6. In combination with a disk, a seed tube mounted to oscillate on its longitudinal axis and also capable of longitudinal movement.

7. In combination with a disk, a seed tube adapted to contact therewith and mounted to have vertical movement as well as oscillate on its longitudinal axis, and means tending to yieldingly depress the tube and maintain said contact with the disk.

8. In combination with the disk, a seed tube mounted to oscillate on its longitudinal axis.

9. In combination with the disk, a seed tube adapted to contact therewith and mounted to oscillate on its longitudinal axis, and means tending to yieldingly maintain said contact.

10. In combination with the disk, a seed tube movable about its longitudinal axis and adapted to engage the disk, and means tending to hold the tube in yielding engagement with the disk.

11. In combination with the disk, an upright seed tube movable around an upright axis and having a forwardly extending portion adapted to contact with the face of the disk, and means acting on the tube and tending to hold the same with its forwardly extending portion in engagement with the disk.

12. In combination with the disk, a seed tube movable about its longitudinal axis and provided with a laterally extending toe acting when the tube turns on its axis to move to and from the disk, and means acting on the tube and tending to hold the same with its toe in yielding engagement with the disk.

13. In combination with a support or frame provided with a socket, a disk mounted on said frame, a seed tube mounted to oscillate in the socket and movable by such oscillation to and from the disk, and means acting on the tube and tending to hold the same in yielding engagement with the disk.

14. In combination with a frame provided with socket, a disk mounted on the frame, a seed tube mounted to swivel in the socket and adapted to engage the disk, and a spring encircling the tube and engaging the frame and the tube.

15. In combination with the supporting arm extending downwardly and forwardly, a disk mounted on the lower end of the arm, a seed tube mounted in the upper end of the arm to oscillate on the longitudinal axis of the tube and adapted at its lower end to engage the side of the disk, and means for holding the lower end of the tube in engagement with the disk.

16. In a seeding machine, the combination with a rotary opening disk, of a seed tube sustained adjacent the disk, one of said parts being yieldable relatively to the other about an axis parallel or substantially so with the axis of the tube.

17. In a seeding machine, the combination with a rotary opening disk, of a seed tube adapted to engage the side of the disk, one of said parts being movable relatively to the other about an axis extending parallel or substantially so with the axis of the tube, and means for holding the seed tube disk in yielding engagement.

18. In combination with a support or frame provided with a socket, a disk mounted on said frame, a seed tube movably mounted in the socket and means acting on the tube and frame and tending to hold the tube in yielding contact with the disk.

19. In combination, a pivoted draw-bar, a disk carried thereby, a seed tube also carried by said draw-bar and movable with the disk and draw-bar when the disk is forced into the ground, said tube also supported so as to oscillate on its axis and move longitudinally of its axis.

20. In combination, a pivoted draw-bar, a disk carried thereby, an arm supported by the draw-bar, a seed tube having its lower and forward end unattached, and means for supporting the tube on said arm, whereby said tube may have vertical movement independent of said arm.

21. In combination, a pivoted draw-bar, a disk carried thereby, a seed tube having its lower and forward end unattached to the disk or its support, means for supporting the tube in its relation to said disk, whereby said tube may have vertical movement, and means for yieldingly holding the tube in working relation with said disk.

22. In combination, a pivotally supported arm, a disk opener carried by said arm, a seed tube also carried by said arm and having a shoe or runner extending forwardly and unattached at its forward end, said tube capable of vertical movement independent of the disk, and means for guiding the tube in its movement.

23. In combination, a pivotally supported arm, a disk opener carried by said arm, a seed tube also carried by said arm and having a shoe or runner extending forwardly and unattached at its forward end, said tube capable of vertical movement, and means tending to yieldingly hold the tube and runner in operative relation to the disk.

24. In combination, a disk opener, a seed tube having a runner in proximity to the convex face of the disk and unattached at its forward end, said tube capable of vertical movement independent of the disk, and guiding means for the tube.

In testimony whereof we affix our signatures, in presence of two witnesses.

CLARENCE A. PATTISON.
LUTHER E. ROBY.

Witnesses:
Chas. W. La Porte,
Laura E. Claypool.